United States Patent [19]

Solinsky

[11] Patent Number: 5,142,400
[45] Date of Patent: Aug. 25, 1992

[54] METHOD AND APPARATUS FOR AUTOMATIC ACQUISITION AND ALIGNMENT OF AN OPTICAL BEAM COMMUNICATION LINK

[75] Inventor: James C. Solinsky, La Jolla, Calif.

[73] Assignee: Cubic Corporation, San Diego, Calif.

[21] Appl. No.: 706,195

[22] Filed: May 28, 1991

Related U.S. Application Data

[63] Continuation-in-part of Ser. No. 456,520, Dec. 26, 1989, Pat. No. 5,060,304.

[51] Int. Cl.$^5$ .......................................... H04B 10/00
[52] U.S. Cl. .................................... 359/159; 359/152; 359/170; 359/172; 359/399; 356/152; 356/153
[58] Field of Search ............... 359/152, 159, 169, 170, 359/173, 182, 172, 399, 406; 356/153, 152; 250/203.3

[56] References Cited

U.S. PATENT DOCUMENTS

| | | | |
|---|---|---|---|
| 3,341,707 | 9/1967 | Wingfield et al. | 359/159 |
| 3,433,960 | 3/1969 | Minott | 359/170 |
| 3,504,182 | 3/1970 | Pizzurro et al. | 359/171 |
| 3,504,979 | 4/1970 | Stephany | 356/152 |
| 3,511,998 | 5/1970 | Smokler | 359/114 |
| 3,566,126 | 2/1971 | Lang et al. | 359/170 |
| 3,658,426 | 4/1972 | Vyce | 356/152 |
| 3,942,894 | 3/1976 | Maier | 356/153 |
| 3,989,942 | 11/1976 | Waddoups | 359/170 |
| 4,279,036 | 7/1981 | Pfund | 359/152 |
| 4,330,204 | 5/1982 | Dye | 356/152 |
| 4,576,480 | 3/1986 | Travis | 356/152 |
| 4,603,975 | 8/1986 | Cinzori | 356/152 |
| 4,867,560 | 9/1989 | Kunitsugu | 356/152 |
| 5,062,150 | 10/1991 | Swanson et al. | 319/152 |

FOREIGN PATENT DOCUMENTS 0314101 5/1989 European Pat. Off. ............ 359/172
0325429 7/1989 European Pat. Off. ............ 359/172

*Primary Examiner*—Edward L. Coles, Sr.
*Assistant Examiner*—Kinfe-Michael Negash
*Attorney, Agent, or Firm*—Brown, Martin, Haller & McClain

[57] ABSTRACT

A method and a preferred apparatus for the searching, acquisition and locking into boresight alignment of two remote optical beam transceivers suitable for use in satellite communications. A first transceiver operates in a search mode while acquiring a communications link with a second transceiver operating in a stare mode. Each transceiver has an optical axis and a retro-reflector that reflects incident beams that are not substantially aligned with the local optical axis while not reflecting all incident beams substantially aligned with the local optical axis. Each transceiver includes an axis-aligned beam transmitting source, a axis-aligned optical detector for incoming beams, a pointing system for aiming the local optical axis in any direction over a hemispherical range, and a beam tracker for maintaining boresight alignment following acquisition. The decision processor includes means for distinguishing between optical beams reflected from the second transceiver and optical beams transmitted by the second transceiver. In operation, the reflected beam increases in intensity as the two transceivers approach alignment but drops to zero as the transceivers attain boreslight alignment. The preferred apparatus includes a matched pair of reflecting telescopes rigidly mounted on a gimballed platform with the transmitting and receiving telescope axes precisely aligned and parallel. Each telescope includes a primary reflector, a secondary reflector with a Cassegrainian focus behind the primary reflector and a tertiary retro-reflector behind an aperture at the vertex of the primary reflector.

8 Claims, 3 Drawing Sheets

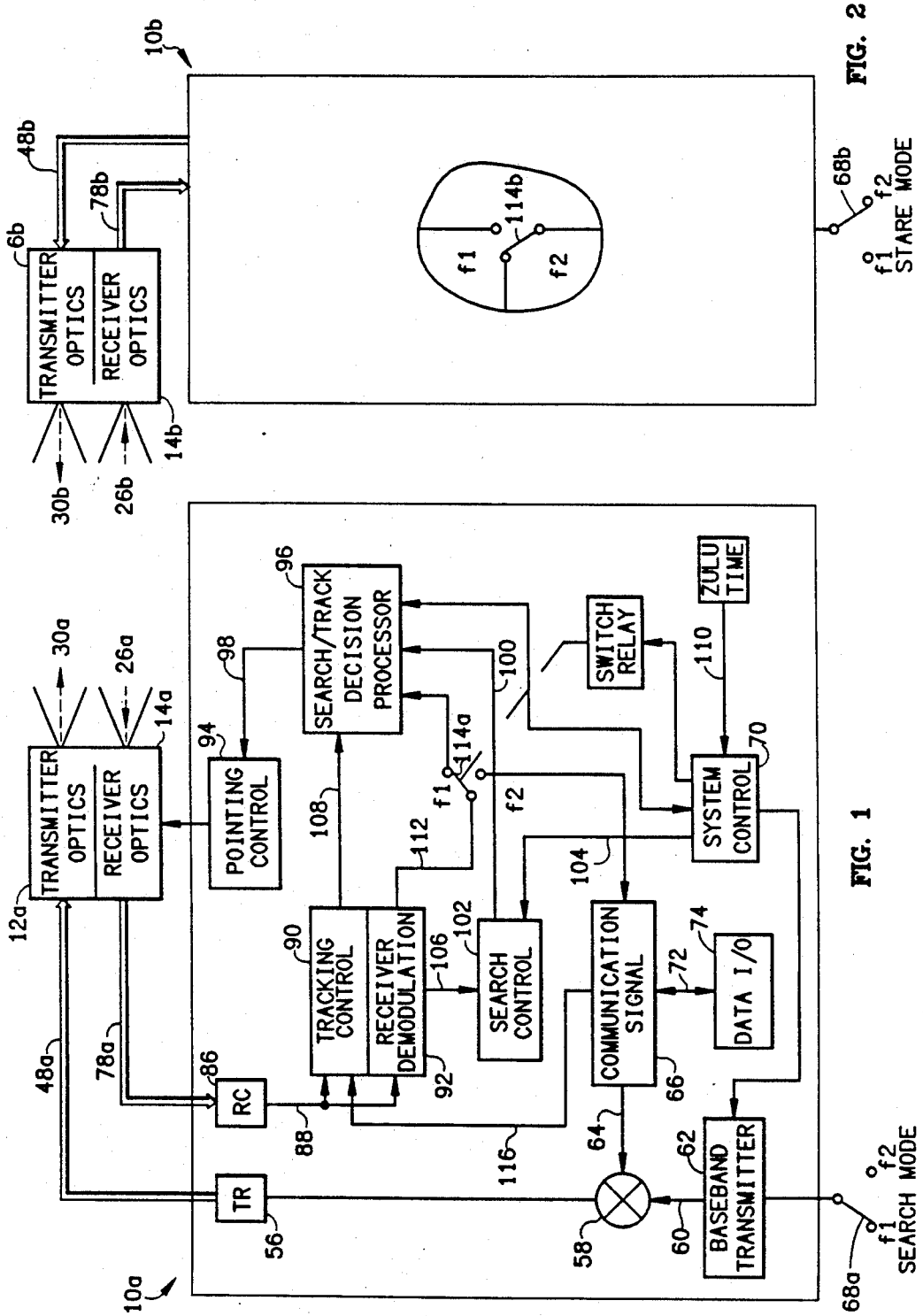

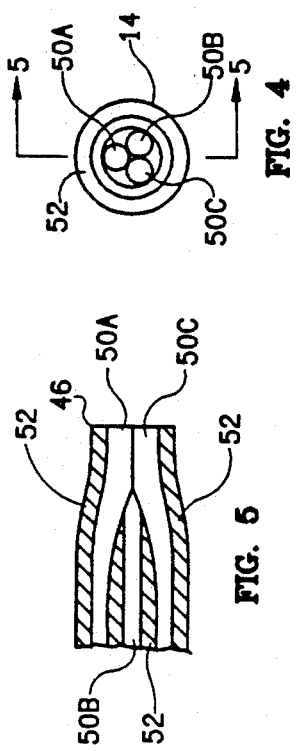
FIG. 4
FIG. 5
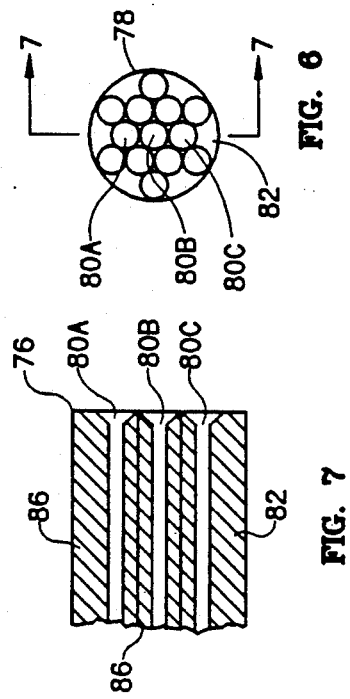
FIG. 6
FIG. 7
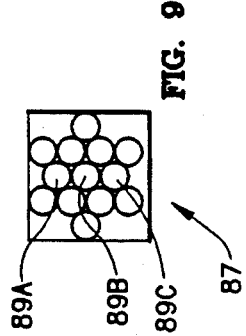
FIG. 9
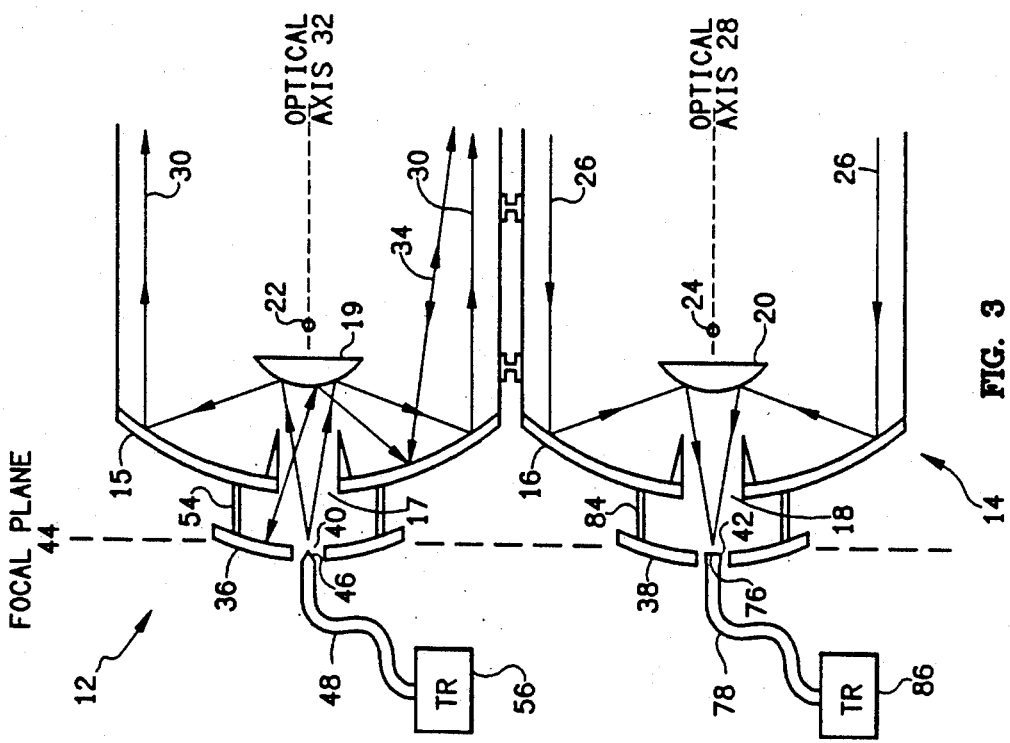
FIG. 3

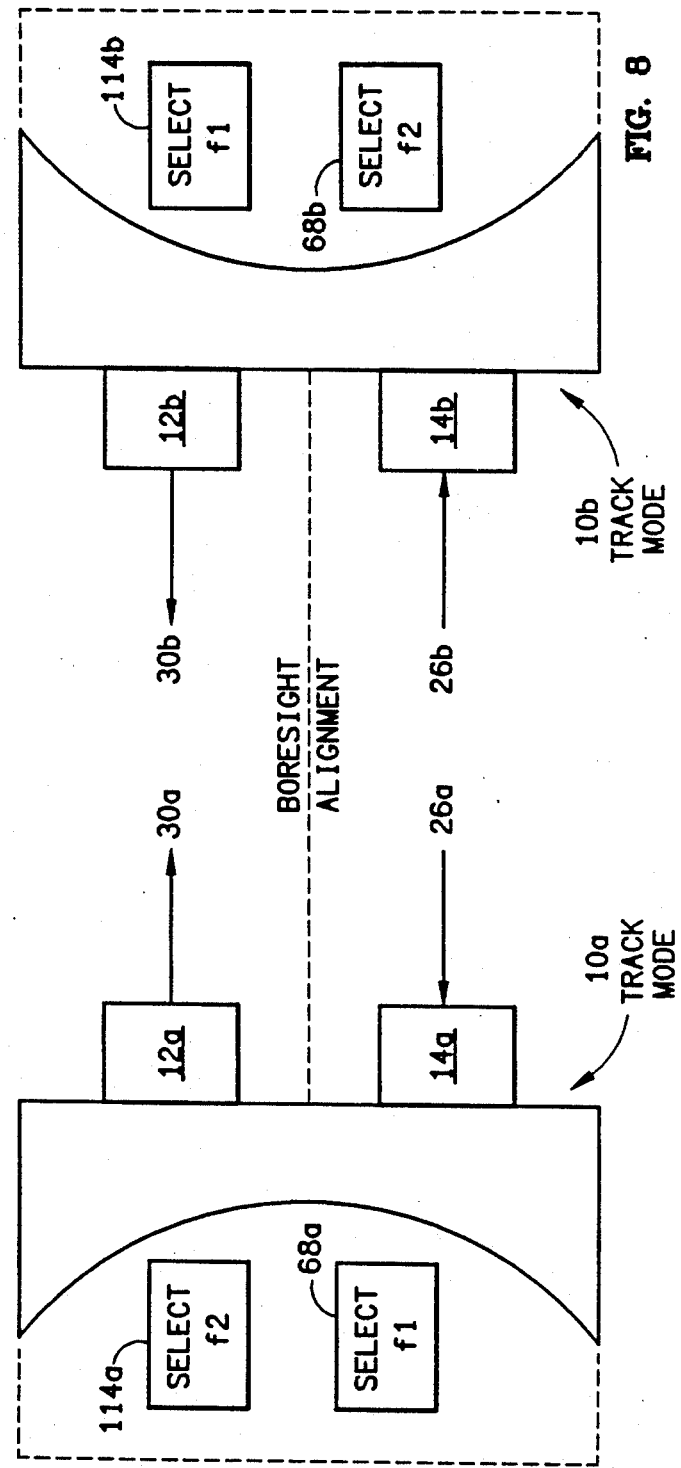

METHOD AND APPARATUS FOR AUTOMATIC ACQUISITION AND ALIGNMENT OF AN OPTICAL BEAM COMMUNICATION LINKcl RELATED PATENTS

This is a continuation-in-part of copending application Ser. No. 07/456,520 filed Dec. 26, 1989 now U.S. Pat. No. 5,060,304.

BACKGROUND OF THE INVENTION

1. Field of the Invention

My invention relates generally to means for acquiring and maintaining an optical communication link between two spatially isolated transceivers and, more specifically, to such means as used in satellite communication applications.

2. Description of the Related Art

The advantages of using optical means for forming a communication link between satellites include enhanced jamming resistance, transmitted data security, and low power consumption. To establish an optical communication link between two transceivers, where each transceiver is mounted on a satellite platform, at least one of the transceivers must actively scan some predefined solid angle, preferably a hemisphere of $2\pi$ steradians. The transceiver initiating the communication link may be called the "searching transceiver" and the other transceiver may be called the "target transceiver," although in some systems each may be actively searching for the other. The searching transceiver may lock onto or "acquire" the target transceiver in response to a beam transmitted by the target transceiver or a reflection of its own transmitted beam returning from a "retro-reflector" on the target transceiver.

Acquisition can be accomplished by means of an active feedback controller in the target transceiver that adjusts the target optics to maintain the incoming beam incident upon the center of a sensor array. A quadrant sensor comprising four photodetectors disposed in a square pattern can be used. The relative intensities of light impinging upon each sensor are used to produce error signals in the horizontal (X) and vertical (Y) directions, relative to an origin lying in the center of the square sensor pattern. The error signals then are used to control servo-motors for adjusting the optics.

It is conceivable that the searching transceiver may never acquire the target transceiver without first obtaining precise boresight alignment between a narrow transmitted laser beam and a sensor. Once such precise boresight alignment is achieved, additional problems arise in maintaining the communication link alignment between the two moving satellites.

Some of these problems known in the art for acquiring and maintaining an optical communication link have been addressed in U.S. Pat. Nos. 3,566,126 issued to Lang et al. and 3,511,998 issued to Smokler. Lang uses a corner reflector as a type of retro-reflector mounted on a second transceiver to aid in acquisition by a first transceiver in the absence of a transmitted signal from the second transceiver. While a retro-reflector can aid target transceiver acquisition, it also can aggravate the crosstalk problem; i.e., the unwanted effects of a transmitted beam interfering with a received beam.

Crosstalk is a well-known problem inherent in systems having coaxial transmitter and receiver optics. Lang closes a mechanical shutter after acquisition to block the signal reflection from the second transceiver and thereby avoids crosstalk between a received message and the reflected transmitted signal. Smokler addresses the crosstalk problem by using separate frequencies, $f_1$ and $f_2$, to distinguish between a "standby" mode and a "call-up" mode. In the standby mode, each transceiver is permitted to transmit only $f_1$ and to receive only $f_2$. In the call-up mode, each transceiver is permitted to transmit only $f_2$ and to receive only $f_1$.

U.S. Pat. No. 3,504,182 issued to Pizzurro et al. reduces crosstalk by using a transceiver having noncoaxial transmitter and receiver optical axes. Similarly, in U.S. Pat. No. 4,867,560 issued to Kunitsugu, each satellite transceiver transmits a beam having a different wavelength. The received beam and a transmitted beam portion, which is split from the main beam by a dichroic mirror, impinge upon a four-quadrant sensor. When the satellites' transmitted beams are aligned, both beams impinge upon the center of the sensor. The output of the four-quadrant sensor represents beam divergence and is used as an error signal to adjust mirrors and realign the beams. This use of mirrors to steer the beams taught by Kunitsugu is very difficult to apply to a complete hemisphere scan, being more useful in situations where substantial alignment has already been achieved.

Various means have been suggested by practitioners in the art for maintaining optical communication where the beams are already substantially aligned. U.S. Pat. No. 3,942,894 issued to Maier uses servo-controlled optical elements that respond to sensors for aligning (and retransmitting) an incoming beam with a fixed reference annular mirror. U.S. Pat. No. 4,330,204 issued to Dye maintains alignment between two hand-held optical communicators by adjusting a spherical mirror in response to error signals from a quadrant sensor.

Other practitioners teach the use of optical communication systems that do not actively control alignment of the beams. U.S. Pat. No. 4,279,036 issued to Pfund discloses a satellite transceiver for use in communicating with a submarine. The transceiver includes a receiving array of detectors and a corresponding transmitting array of lasers. A particular laser element is selected according to which detector is energized by the beam transmitted from the submarine, which is presumed to know the satellite location. The beam then transmitted from the satellite illuminates the general area from which the submarine's beam was received. By illuminating a wide area, however, many of the advantages of a narrow beam are not realized.

U.S. Pat. No. 3,433,960 issued to Minott discloses a method that modulates and reflects a beam transmitted from a first ground station and incident upon the satellite's "retrodirective modulator" with modulation information extracted from a second beam incident on the satellite and transmitted from a second ground station. Minott relies on the ground stations to maintain beam alignment with the satellite.

U.S. Pat. No. 3,989,942 issued to Waddoups presents an Identification Friend or Foe (IFF) transponder that modulates and reflects an incoming beam. Unlike Minott, Waddoups includes means for active search and tracking of the ground station by the satellite using a Cassegrainian telescope and a quadrant sensor, although no specific methods for ground station acquisition are suggested.

Many problems remain unsolved in the art of reliable acquisition and maintenance of an optical communication link between two spatially isolated transceivers. Retro-reflectors have not heretofore been used successfully without undue crosstalk. Devices that maintain precise beam alignment have not been practically operated in harmony with telescopic acquisition means. These unresolved problems and deficiencies are clearly felt in the art and are solved by my invention in the manner described below.

SUMMARY OF THE INVENTION

My invention uses two parallel (non-coaxial) Cassegrainian telescopes that are rigidly mounted in relation to each other on a gimballed platform so that they may move synchronously through a $2\pi$ steradian hemisphere scan region relative to the main satellite platform. In addition to the primary and secondary reflectors composing a typical Cassegrainian telescope, each telescope has a type of retro-reflector known as a "cats-eye" mounted directly behind the primary reflector. The cats-eye, like the primary reflector, has an aperture at its vertex. The purpose of the cats-eye is to reflect a portion of an incoming beam passing through the aperture of the primary reflector that is not centered precisely in boresight alignment at the vertex of the telescope.

Crosstalk is minimized by using one non-coaxial telescope for transmitting and the other for receiving. A plurality of optical fibers, bundled together at their ends, are located at the vertex of the receiving telescope. The optical axis of each fiber is aligned with the axis of the telescope. These fibers connect the receiving telescope to an optical receiver unit, which can therefore be spatially separated from the telescope, although located on the same platform. These fibers are tapered and their cladding removed in the region near the bundled end.

The Gaussian distribution of the light impinging upon the bundled-fiber end is detected by a tracking control unit (collocated with the receiver unit), which issues signals to a pointing control unit that controls the motion of the gimballed telescope platform. Through redundancy, the use of a fiber plurality increases reliability and promotes graceful degradation upon individual fiber failure. A similar but smaller bundle of fibers is located at the vertex of the transmitting telescope. Fiber plurality is preferred primarily for purposes of redundancy. This smaller fiber bundle connects the transmitting telescope to an optical transmitter unit.

A first transceiver is said to be in a "search" mode when attempting to acquire a second transceiver that is in a "stare" mode. In search mode, the first transceiver transmits a first baseband frequency $f_1$ and the second transceiver transmits a second baseband frequency $f_2$. The pointing control unit positions the telescopes in response to commands generated by a search algorithm. The search algorithm initially traces a spiral search path. Light impinging upon the searching (first) transceiver's sensor is analyzed for modulation at $f_1$, which would indicate a reflected component of the first baseband frequency. Detection of $f_1$ by the first transceiver occurs only when the first and second transceiver telescopes are close to boresight alignment because only then is a portion of the first transceiver's transmitted beam being reflected by the second transceiver's cats-eye retro-reflector. The second transceiver similarly analyzes the light impinging upon its sensor for modulation at $f_2$ to determine the presence of a reflected component of its transmitted baseband frequency.

When the first transceiver detects modulation at $f_1$, the search algorithm is modified and the spiral search region narrowed. The first transceiver's search controller further narrows the search region in response to detected variations in reflected beam power. As the transceivers near alignment, the received beam power increases. A decision processor in the first transceiver then monitors the received beam power for an increase followed by an abrupt drop; such a pattern indicating that the transmitted beam is no longer reflected by the second transceiver's cats-eye, but is instead nonreflectively impinging upon the second aperture at the cats-eye vertex. The decision processor at the first transceiver then analyzes the light impinging upon its receiver sensor for modulation at the second transceiver's transmitted baseband frequency, $f_2$, and "microsearches" for a power maximum, thereby bringing the two transceivers into precise boresight alignment.

At approximately the same time that the first transceiver detects modulation at $f_1$, the second transceiver detects modulation at $f_2$. The second transceiver then begins looking for $f_1$ and "microsearches" for a power maximum indicating precise alignment. The two transceivers remain locked in boresight alignment because minute corrections are continuously made by each transceiver in accordance with tracking algorithms known in the art, such as Kalman or alpha-beta algorithms.

An important advantage of my invention is that additional search information other than mere baseband frequency coding may be encoded into the optical beams. Both transceivers may, in search mode, transmit beams having baseband modulation frequencies of $f_1$ and each beam may be encoded with information to aid the other transceiver in locating it.

The foregoing, together with other features and advantages of my invention, will become more apparent when referring to the following specifications, claims, and the accompanying drawings.

BRIEF DESCRIPTION OF THE DRAWINGS

FIG. 1 is a block diagram of a first transceiver of my invention;

FIG. 2 is a block diagram of a second transceiver of my invention;

FIG. 3 is a schematic diagram of the transmitter and receiver optics of a transceiver of my invention;

FIG. 4 is an elevational view of the terminus of a transmitter fiber optic bundle;

FIG. 5 is a partial section of the terminus of the transmitter fiber optic bundle;

FIG. 6 is an elevational view of the terminus of a receiver fiber optic bundle;

FIG. 7 is a slightly expanded cross-section of the terminus of the receiver fiber optic bundle of FIG. 6 taken along line 7—7;

FIG. 8 illustrates two transceivers locked into alignment in accordance with the action of my invention;

FIG. 9 illustrates the photodiode optical detector array means for determining the spatial distribution of an incoming optical beam; and FIG. 10 shows the mode switch settings for each operating mode in both transceivers.

DESCRIPTION OF THE PREFERRED EMBODIMENT

Referring to FIGS. 1 and 2, two transceivers 10, generally designated 10a and 10b, are illustrated. The transmitter optics 12 (12a and 12b) and the receiver optics 14 (14a and 14b) are physically separated from the remainder of transceivers 10 (10a and 10b) to allow independent motion of optics 12-14 through at least a 2π steradian hemisphere with respect to the satellite platforms (not shown) on which transceivers 10 are located. Most of transceiver 10b is omitted from FIG. 2 because it is identical to transceiver 10a in FIG. 1. Therefore, a general description of one will fully suffice for the other except where differences in switch settings are specifically noted. General references to the apparatus are made by omitting the (a) and (b) designators from the drawing reference numerals.

Referring to FIGS. 1 and 2, transmitter optics 12 and receiver optics 14 comprise a matched pair of front surface reflecting telescopes having essentially identical Cassegrainian configurations. Optics 12 is for transmitting and optics 14 is for receiving optical beams. Optics 12 and 14 are rigidly mounted in relation to each other such that their optical axes are offset but boresight aligned in parallel. Optics 12 and 14 are attached to the main satellite platform (not shown) with a gimballed mounting (not shown). The pointing motion is controlled by one or more motors (not shown) in any suitable manner known in the art.

Transmitter optics 12 and receiver optics 14 are more fully illustrated in FIG. 3. Optics 12 and 14 comprise parabolic transmitter and receiver primary reflectors 15 and 16, respectively. Primary reflectors 15 and 16 have a transmitter primary reflector aperture 17 and a receiver primary reflector aperture 18 centered at their respective vertices. A hyperbolic transmitter secondary reflector 19 and a hyperbolic receiver secondary reflector 20 are optically aligned with primary reflectors 15 and 16, respectively. Secondary reflectors 19 and 20 are interposed between primary reflectors 15 and 16 and their corresponding primary reflector focal points 22 and 24, respectively.

In receiver optics 14, an incoming beam 26 that is boresight aligned with the receiver primary reflector optical axis 28 is reflected by primary reflector 16 onto secondary reflector 20. Incoming beam 26 is reflected by secondary reflector 20 through primary reflector aperture 18. Primary reflector aperture 18 is large enough to permit substantially all of the beams reflected by secondary reflector 20, including unaligned beams, to pass therethrough. Transmitter optics 12 are identical to receiver optics 14. In transmitter optics 12, an outgoing beam 30 is reflected by secondary reflector 19 onto primary reflector 15, which reflects outgoing beam 30 away from optics 12 along the transmitter primary reflector optical axis 32. As in receiver optics 14, primary reflector aperture 17 is also large enough to permit a somewhat unaligned beam 34 to pass therethrough.

Optics 12 and 14 comprise transmitter and receiver cats-eye retro-reflectors 36 and 38 respectively. Cats-eye retro-reflectors 36 and 38 have transmitter and receiver cats-eye apertures 40 and 42 centered at their respective vertices as shown in FIG. 3. Cats-eye retro-reflectors 36 and 38 are mounted behind primary reflectors 15 and 16, respectively. Cats-eye retro-reflectors 15 and 16 are positioned with their respective cats-eye apertures 40 and 42 at the common Cassegrainian focal plane 44 of optics 12 and 14. Incoming beam 26, being substantially aligned with optical axis 28, passes through cats-eye aperture 42. However, beam 34, not being substantially aligned with optical axis 32, is reflected by cats-eye retro-reflector 36 back along the same path to the source of beam 34.

The transmitter bundle terminus 46, which is one end of the transmitter fiber bundle 48, is precisely and rigidly disposed within cats-eye aperture 40 at the nexus of focal plane 44 and axis 32. Bundle 48 comprises a plurality of optical fibers 50, exemplified by transmitter fibers 50A, 50B, and 50C in FIGS. 4 and 5. Each fiber 50 comprises a core surrounded by transmitter fiber cladding 52. As illustrated in cross-section in FIGS. 4 and 5, transmitter fibers 50 are hot-drawn as a group to a tapered point. Cladding 52 is removed from a portion of each fiber 50, which are arrayed in a symmetrical pattern at terminus 46. In addition to providing redundancy, a multiplicity of transmitter fibers 50 allows increased transmitter power and I prefer such multiplicity to a single fiber 50, which will also perform suitably.

Terminus 46 is rigidly mounted in relation to cats-eye retro-reflector 36 using transmitter adjustable attachment points 54. Terminus 46 is precisely disposed such that the axis of bundle 17 is boresight aligned with optical axis 32. Bundle 48 is in optical communication with a transmitter 56, which comprises one or more laser sources (not shown).

As shown in FIG. 1, transmitter 56 produces a modulated optical signal in bundle 48 in response to signals from a signal mixer 58. Mixer 58 modulates the baseband signal 60 from a baseband transmitter 62 with the communication signal 64 from a communication signal adapter 66. Baseband transmitter 62 generates periodic baseband signal 60 having a sinusoidal frequency of $f_1$ or $f_2$ depending on the setting of a baseband selection switch 68. The system controller 70 may change the setting of switch 68 if necessary. Communication signal adapter 66 acts as an interface for converting between the format of the data 72 at a data input/output (I/O) device 74 and the formats of various communication signals used within transceiver 10.

As shown in FIG. 3, the receiver bundle terminus 76, which is one end of the receiver fiber bundle 78, is rigidly and precisely disposed within cats-eye aperture 42 at the nexus of focal plane 44 and axis 28. Bundle 78 comprises a plurality of optical fibers 80, exemplified by receiver fibers 80A, 80B, and 80C in FIGS. 6 and 7. Each fiber 80 has a core surrounded by receiver fiber cladding 82. As illustrated in cross-section in FIGS. 6 and 7, the core diameters of all fibers 80 are expanded at terminus 76 to enhance the acceptance of beams incident upon cats-eye aperture 42 from various angles. Fibers 80 are arrayed in a symmetrical pattern at terminus 76 and the ends may be polished to form a flat optical surface at terminus 76.

Terminus 76 is rigidly mounted in relation to cats-eye retro-reflector 38 using receiver adjustable attachment points 84 and the center axis of bundle 78 is boresight aligned with optical axis 28. Bundle 78 is in optical communication with a receiver 86, which comprises a matrix of beam intensity detecting elements 87 shown in FIG. 9. Matrix 87 may comprise photodiodes 89. I prefer PIN (positive-intrinsic-negative) photodiodes 89 because of their fast response time and wide spectral sensitivity. I use a multiplicity of receiver fibers 80 not only to provide redundancy but also to maintain a useful spatial correspondence between individual photodiodes 89 and a particular region in the surface of terminus 76. This correspondence provides useful data for the algorithms used to track incident beam 26.

As shown in FIG. 1, receiver 86 produces the receiver signals 88 in response to a received modulated beam and communicates signals 88 to a tracking controller 90 and a receiver demodulator 92. Receiver demodulator 92 detects the presence of modulation at either $f_1$ or $f_2$. Stray light, coming from a source other than another transceiver, has no modulation at either $f_1$ or $f_2$ and may be electronically removed by filtering. Receiver 86 performs cross-diode differential power measurements that are useful with sophisticated tracking algorithms known in the art. Such algorithms, including Kalman and alpha-beta, use the time rate of change of the Gaussian intensity distribution of an incident beam spot (not across the surface of terminus 76. Receiver 86 also provides the sum of the photodiode power measurements because my preferred search algorithm and many other tracking algorithms require only the total incident light intensity.

The motors (not shown) that position optics 12-14 are controlled by a pointing controller 94 in response to azimuth and bearing information received from a decision processor 96. Decision processor 96 determines the optimal time for switching from search mode to track mode and communicates the decision to system controller 70. Initially, in search mode, decision processor 96 provides pointing controller 94 with a pointing signal 98 in response to a search signal 100 from the search controller 102. Search controller 102 provides search signal 100 in response to a retro-reflected frequency detection signal 106 from receiver demodulator 92 and search information 104, comprising search rate and angular search diameter, from system controller 70. Controller 70 executes the searching algorithm. Decision processor 96 switches from search mode to track mode when it determines that transceivers 10a and 10b are substantially in alignment and then attempts to establish and maintain precise boresight alignment by providing pointing controller 94 with track information 108 from tracking controller 90.

In operation, when first transceiver 10a attempts to acquire second transceiver 10b, transceiver 10a is said to be in "search" mode. Optics 12a and 14a will then typically be moved along a spiral searching path at a constant angular velocity. Transceiver 10a transmits a beam (not shown) having a baseband frequency of $f_1$. Transceiver 10b will typically maintain optics 12b and 14b on a fixed point in space in a "stare" mode and may periodically change the stare angle to optimize the acquisition process. Transceiver 10a may perform a time period masking procedure, which alternates periods of search and stare to enhance acquisition probability. A relative Zulu time source 110 is available to system controller 70 for use in facilitating and selecting among available acquisition algorithms. Transceiver 10b may transmit at a baseband frequency of $f_2$ or it may not transmit at all and merely allow itself to be passively acquired by transceiver 10a. Transceivers 10 can also be used to acquire passive targets other than another transceiver, such as simple reflectors. The flexible architecture of my transceiver invention allows the use of many different search and track algorithms suitable for optimizing acquisition.

Receiver demodulator 92a of the transceiver 10a analyzes receiver signals 88a for the presence of modulation at $f_1$, which indicates a reflection from transceiver 10b. Decision processor 96a monitors the modulation detection signal 112a from receiver demodulator 92a and analyzes changes in signal 112a. Signal 112a is routed via baseband detection switch 114a, controlled by system controller 70a, to decision processor 96a. Switch 114a may be a solid-state relay or other suitable switching device. When decision processor 96a detects the presence of a signal having a modulation at $f_1$, indicating a transmitted beam a reflection by optics 12b and 14b of transceiver 10b, it notifies system controller 70a, which reduces the size of the search mode spiral region for transceiver 10a.

At this point during operation, transceivers 10a and 10b are nearly in alignment. However, two-way data communication is not yet possible because neither transmitted beam 30 is impinging upon the other receiver bundle terminus 76. Each transceiver 10 is receiving only a reflection 34 of its own beam 30 (or a portion of it). Decision processor 96a then monitors modulation detection signal 112a for a maximum amplitude followed by an abrupt drop, indicating that transmitted beam 30a is passing over cats-eye aperture 42b of transceiver 10b and is no longer being reflected. At this point, transceivers 10a and 10b are substantially aligned and beam 30b from transmitter 10b is now impinging upon terminus 76a of transceiver 10a. Decision processor 96a notifies system controller 70a of a change from search mode to "track" mode. System controller 70a then toggles switch 116a, thereby routing modulation detection signal 112a to communication signal adapter 66a for tracking beam 30b received from transceiver 10b.

Now, tracking controller 90a monitors the tracking signal 116a. Signal 116a is derived from modulation detection signal 112a, which now indicates modulation at $f_2$, by communication signal adapter 66a. Tracking controller 90a causes pointing controller 94a to maintain the received beam spot centered on the axis of terminus 76a in accordance with a suitable tracking algorithm executed by system controller 70a.

Transceiver 10b, monitoring a reflection of $f_2$ beam 30b, senses a similar pattern over time of a maximum intensity followed by an abrupt drop and thereupon switches to tracking $f_1$ beam 30a transmitted by transceiver 10a. Transceivers 10 track each other in boresight alignment as shown in FIG. 8 so long as each detects (on beam 26) sufficient beam 30 intensity from the other. Data 72 may then be encoded into beams 30 for transmission. Where received beam 26 is interrupted or becomes weak, tracking controller 90 causes decision processor 96 to initiate a "reacquire search mode." System controller 70 may then execute a search algorithm that uses historical tracking information. Either transceiver 10 may independently enter the reacquire search mode upon loss of received beam 26. Note that FIG. 10 shows the switch 68 and 114 settings for the three search, track and reacquire transceiver operating modes.

The foregoing description and drawings are provided for illustrative purposes and my invention is not limited to the embodiments disclosed, but is intended to embrace any and all alternatives, equivalents, modifications and rearrangements of elements falling within the scope of the invention as defined by the following claims, which include all such obvious embodiments and modifications when viewed in conjunction with the above specification and accompanying drawings.

I claim:

1. An optical transceiver communications system comprising at least two transceivers, each having an optical axis and each comprising:
   optical transmitter means for projecting a first outgoing optical beam aligned with said optical axis, said beam having at least one modulation characteristic;

optical receiver means for collecting an incoming optical beam;

receiver demodulator means for detecting the modulation characteristics of said incoming optical beam and for generating at least one modulation detection signal;

mode selector means, responsive to said modulation detection signals, for generating a mode control signal specifying one of a plurality of preselected searching and tracking modes;

search controller means, responsive to said mode control signal, for generating a search control signal;

decision processor means, responsive to said modulation detection signals and said search control signal, for generating a pointing signal; and pointing controller means, responsive to said pointing signal, for steering said optical axis to a desired direction.

2. The transceiver described in claim 1, wherein said optical transmitter means and said optical receiver means each comprises:

a primary reflecting means for parabolically reflecting incident beams, said primary reflecting means having a first focal point, a first vertex, a first optical axis, and a first aperture centered at first vertex;

a secondary reflecting means, interposed between said primary reflecting means and said first focal point, for hyperbolically reflecting incident beams through said first aperture, said secondary reflecting means having a second optical axis coaxially aligned with said first optical axis; and a retro-reflecting means, disposed behind said primary reflecting means, for reflecting all incident beams passing through said first aperture, said retro-reflecting means having a second vertex and a second aperture centered at said second vertex.

3. The transceiver described in claim 2, wherein said optical transmitter means further comprises:

a plurality of laser sources for emitting light; and a plurality of transmitter fibers, each corresponding to one of said laser sources and each having a first and second end, said first ends being optically coupled to said corresponding laser source to receive said light emitted by said corresponding laser source and said second ends being disposed adjacent to and in parallel with one another at said second aperture to emit a plurality of optical beams through said second aperture.

4. The transceiver described in claim 2, wherein said optical receiver means further comprises:

a plurality of receiver fibers, each having a first and second end, said second ends being disposed adjacent to and in parallel with one another at said second aperture to collect light from said incoming beams incident at said second aperture; and a plurality of optical detectors, each said detector optically coupled to said first end of a corresponding receiver fiber, said detectors being for detecting the spatial intensity distribution of light impinging upon said second ends of said receiver fibers and for providing receiver signals in response to said light.

5. The transceiver described in claim 4, wherein each said optical light detector comprises:

a photodiode for providing an electrical receiver signal proportional to the intensity of said light impinging thereon.

6. The transceiver as in claim 1 wherein said detectable characteristics of said outgoing and incoming beams comprises:

baseband frequency modulation.

7. The transceiver as in claim 1 further comprising:

a means for modulating said outgoing beam with a communication signal; and a means for recovering communication signals from said incoming beam where said incoming beam is modulated with a communication signal.

8. A method for acquiring boresight alignment between the optical axes of at least two transceivers in a communications system comprising at least two remote optical transceivers disposed such that optical alignment between them is possible, at least one transceiver having a stare mode in which an optical beam modulated by a first baseband signal is transmitted along the transceiver optical axis and another transceiver having a search mode in which it points in a direction within a hemisphere while transmitting an optical beam modulated by a second baseband signal, said transceiver in stare mode having means for retro-reflecting all incident optical beams not substantially aligned with the optical axis of said staring transceiver while not reflecting incident optical beams that are substantially aligned with said staring transceiver optical axis, each transceiver having means for detecting an incident beam substantially aligned with its optical axis, comprising the steps of:

causing a first transceiver to operate in said stare mode while continuously transmitting an optical beam modulated by said first baseband signal;

pointing a second transceiver in a search pattern over a hemisphere while transmitting an optical beam modulated by said second baseband signal;

reducing the angular search pattern region of said second transceiver upon detection of a second baseband modulated incoming optical beam;

adjusting the pointing direction of said second transceiver as necessary to increase the intensity of said second baseband modulated incoming optical beam;

switching said second transceiver detection means to detect an incoming optical beam modulated by said first baseband signal upon detection of a significant and relatively abrupt reduction in said second baseband modulated incoming optical beam; and tracking said first baseband incoming optical beam from said first transceiver with said second transceiver to maintain boresight alignment between said first and second transceiver optical axes.

* * * * *